United States Patent [19]

Kim

[11] Patent Number: 5,694,340
[45] Date of Patent: Dec. 2, 1997

[54] METHOD OF TRAINING PHYSICAL SKILLS USING A DIGITAL MOTION ANALYZER AND AN ACCELEROMETER

[76] Inventor: Charles Hongchul Kim, 3432 Stage Coach Dr., Lafayette, Calif. 94549

[21] Appl. No.: 416,633

[22] Filed: Apr. 5, 1995

[51] Int. Cl.⁶ ................................................. G06F 19/00
[52] U.S. Cl. ........................... 364/566; 364/578; 434/252
[58] Field of Search ............................. 364/566, 559, 364/565, 578; 340/689; 73/514.33, 514.36; 434/247, 252; 473/269, 409, 216, 218, 265, 214, 384, 228, 266, 201, 209; 345/163

[56] References Cited

U.S. PATENT DOCUMENTS

| | | | |
|---|---|---|---|
| 3,805,097 | 4/1974 | Yanchich | 310/8.4 |
| 3,945,646 | 3/1976 | Hammond | 273/186 A |
| 4,839,838 | 6/1989 | LaBiche et al. | 364/709.11 |
| 4,891,748 | 1/1990 | Mann | 364/410 |
| 4,996,877 | 3/1991 | Stewart et al. | 73/510 |
| 5,065,628 | 11/1991 | Benecke | 73/517 R |
| 5,111,410 | 5/1992 | Nakayama et al. | 364/551.01 |
| 5,114,150 | 5/1992 | Matsumura | 273/186 R |
| 5,181,181 | 1/1993 | Glynn | 364/566 |
| 5,221,088 | 6/1993 | McTeigue et al. | 434/252 |
| 5,233,544 | 8/1993 | Kobayashi | 364/566 |
| 5,246,232 | 9/1993 | Eccher et al. | 273/184 R |
| 5,297,796 | 3/1994 | Peterson | 273/183.1 |
| 5,300,921 | 4/1994 | Hoch et al. | 340/573 |
| 5,334,028 | 8/1994 | Melligan | 434/252 |
| 5,335,918 | 8/1994 | Rupnik et al. | 273/186.2 |
| 5,338,036 | 8/1994 | Takeuchi et al. | 273/187.2 |
| 5,338,037 | 8/1994 | Toyohara | 273/187.6 |
| 5,344,152 | 9/1994 | Brannen | 273/189 R |
| 5,348,304 | 9/1994 | Meade | 273/187.6 |
| 5,350,177 | 9/1994 | Furbush, Jr. | 273/191 R |
| 5,351,951 | 10/1994 | Hodgetts | 273/77 A |
| 5,358,250 | 10/1994 | Spenser | 273/187.2 |
| 5,358,251 | 10/1994 | Ashton | 273/195 B |
| 5,419,562 | 5/1995 | Cromarty | 273/183.1 |
| 5,430,435 | 7/1995 | Hoch et al. | 340/573 |

OTHER PUBLICATIONS

T. Jorgensen, "The Physics of Golf", American Institute of Physics (1994).
C. Ajluni, "Accelerometero: Not Just For Airbags Anymore", Electronic Design, Jun. 12, (1995).
AMP, Inc., "Accelerometer ACH-04-08", AMP Catalog 65750, p. 7, 1994.

*Primary Examiner*—James P. Trammell

[57] ABSTRACT

A method of training and simulating physical skills using a digital motion analyzing device that measures the necessary and sufficient information to describe uniquely a rigid body motion. The device, comprising a programmable digital signal processor and a universal accelerometer, measures the acceleration and calculates the linear velocity, the angular velocity, the orientation, and the position of a moving object, and stores and plays back the motion using audiovisual means and compares it with other pre-recorded motions. The student can choose a model and try to imitate the model with the help of audiovisual means and biofeedback means. The device is portable. It can also be connected to a computer where the motion can be further analyzed by comparing it with a database comprising many other characteristic motions. If a projectile is involved, such as in a golf swing, the trajectory of the projectile is calculated.

10 Claims, 5 Drawing Sheets

METHOD OF TRAINING PHYSICAL SKILLS USING A DIGITAL MOTION ANALYZER AND AN ACCELEROMETER

BACKGROUND

1. Field of Invention

This invention relates to a method of training and simulating physical skills using a digital motion analyzing device, comprising a programmable digital signal processor and a universal accelerometer, that measures and calculates the accelerations, the velocities, the orientations, and the positions of a moving object, and stores, plays back, and compares motions using audiovisual means.

2. Description of Prior Arts

Golf courses are green refuges from the fast-paced modern life, places where people go to slow down, delight in the outdoors and enjoy friendly competition. That is in theory. In practice, golf games are all but relaxing because those beautiful swings are good to watch but difficult to imitate. Golf is just an example. There are many sports that involve rather complicated sequence of motions which are difficult to learn because of the lack of diagnostics and feedback mechanisms.

Many people have invented motion analyzing devices recently to help students as well as teachers in overcoming the difficulties in training physical skills. These devices usually have the capabilities of measuring, storing, and playing back some aspect of the motion. Most of these inventions rely heavily on visual means of interacting with users. The present invention uses both the audio means and the visual means by taking advantage of the rapidly developing multimedia technologies.

Learning starts with an imitation. Imitation of motion is usually very difficult. It is more difficult than imitation of a sound, for instance. Our body has the extraordinary capability of remembering musical melodies better than physical motions. For example, consider a virtuoso pianist practicing a very fast piano music. Imagine that the piano, for some terrible reasons, does not make any sound, so that the pianist has to practice by observing visually an accomplished player and try to imitate the finger motions. It is clearly very difficult, if not impossible, for him to create a good music in this way.

We can apply the same principle in sports training. We can utilize our audio sensory system, which has been idling while the rest of our body is busy trying to learn the physical skill. Audio signals offer a fast and intuitive means of playing back recorded motions.

Motion analyzing devices available today can be conceptually categorized into the following three types: (1) devices that measure positions; (2) devices that measure velocities; and (3) devices that measure accelerations.

Position-sensitive motion analyzers use either video-cassette-recorder or photographic-film cameras to record motion. In his pioneering work in applying the laws of physics to a golf swing, T. Jorgensen[1] used the stroboscopic technique to record a golf swing and obtained 140 frames per second overlaid on a film. More frames per second are possible but the exposed points on the film started to overlap at some dynamically critical positions, where the motion is slow but the acceleration is large.

[1]Theodore Jorgensen, "The Physics of Golf," American Institute of Physics Press (1994)

R. V. Mann[2] used the computerized image processing technology to display the student's video image. He then compared the student's motion with a model, who is an accomplished performer of the skill, by overlaying the two images on a computer screen.

[2]Ralph V. Mann, "A system and method of teaching physical skills," U.S. Pat. No. 4,891,748 (1986)

The position data is always bulky and not simple to process because cameras cannot distinguish the moving object from the empty background. Data analysis requires a large computer and a large memory. The size and the speed of the data analyzing equipment are not fit for portable applications. More important limitations come from the fact that three-dimensional aspects of the motion will be missed because of the limited number of viewing angles and the discrete time steps.

Velocity-sensitive motion analyzers measure the speed of the moving object by measuring the time-of-flight between two stationary points where sensors are located. Magnets, lights, lasers, or radio frequency radars are used to detect the passage of the object. The speed and the direction of the object at the measuring station are calculated and displayed instantly. However, this method only measures the results of the motion and not the motion itself. Students are still on their own without any diagnostics when the measured results are not satisfactory. The data is not comprehensive enough for the purpose of sports training.

Acceleration-sensitive motion analyzers use acceleration sensors that are attached to the moving object and continuously monitor the motion during the specified interval of time. Acceleration is a quantity that is more directly related to the dynamics of the motion in which the laws of physics and biomechanical terminology apply. Integration of the acceleration over time yields the velocity, and integration of velocity over time yields the position. Other advantages of using acceleration sensors are that there are no missing angles nor any dead-times in the measurements. Using an adequate number of acceleration sensors, we can measure the necessary and sufficient number of variables we need to know to describe the motion uniquely and distinctly.

K. Kobayashi[3] used up to three acceleration sensors in the shaft like portion of a swing practice device to analyze swing motions. He developed a two-dimensional model to calculate and display the sequential positions of the shaft in the swing plane. A video display device was used to display the calculated sequential position of the club shaft. A buzzer or speaker was used to notify the user when the angular acceleration was greater than the target value. He also used an analog circuit to generate "a sound having a frequency level corresponding to the acceleration of the shaft." Kobayashi's invention does not provide adequate features and comprehensive information that are necessary for training physical skills.

[3]Kazutoshi Kobayashi, "Swing Analyzing Device," U.S. Pat. No. 5,233,544, Date Aug. 3, 1993.

My present invention is of the acceleration sensitive type as is the Kobayashi's invention. However, there are many important differences between my invention and Kobayashi's invention. (1) The main purpose of my invention is sports training, by comparing the student's motion with an accomplished performer's motion using audiovisual means. This is a new sports-training method utilizing the human audio-sensory facility. Direct comparison of the student's motion and the model's motion is possible in real time using the digital signal processing technology. This aspect of my invention is explained in detail in Section 6. Kobayashi's objectives were to use acceleration measurements to calculate velocities and positions of the object and to display the result on a video screen to be used in conjunction with other conventional swing simulators. (2) I used a three-dimensional model while Kobayashi used a two-dimensional model. The two-dimensional model is similar to studying the shadow of the three-dimensional object projected on a two-dimensional surface. Only the three-dimensional model can show important details of motions. Take a golf swing as an example. Motions such as the turning of the upper torso, cocking of the wrists, lifting of arms and shifting of weight can only be distinguished in the three-dimensional picture. (3) With my invention the comprehensive analysis and diagnostics make specific recommendations for improvements possible.

G. W. Hodgetts[4] used an accelerometer to measure the bandwidth and the damping factor of a golf club. The measured club parameters were used for fitting the club with a player. Hodgetts'invention was not intended for any sports training.

[4]George W. Hodgetts, "Identification And Use Of Golf Club Selectivity," U.S. Pat. No. 5,351,951, Date Oct. 4, 1994.

OBJECTS AND ADVANTAGES

Accordingly, several other objects and advantages of the present invention are:

(1) to measure the acceleration of a moving object in three dimensions using acceleration sensors and to store and analyze the motion using a digital-signal-processing and memorizing devices;

(2) to create a model by pre-recording the acceleration pattern of an accomplished performer;

(3) to playback the stored accelerations using audiovisual means;

(4) to compare the acceleration pattern of a student with the model in real time and generate an instant feedback using audiovisual means;

(5) to synthesize a sound based on the characteristics of the acceleration and to use the method for comparing motions in real time;

(6) to make the device portable;

(7) to analyze the motion in great detail by further calculating the velocity, the position and the torque, and finding the cause and cure of problems, if any;

(8) to characterize the impact phenomena, if a projectile is involved, by calculating such parameters as the velocity, spin, carry distance, accuracy, etc.;

More objects and advantages of my invention will become apparent from the drawings and ensuing descriptions.

DESCRIPTION OF DRAWINGS

FIG. 1 A schematic illustration of the basic principle and the signal processing of the present invention FIG. 2 An artist's conception of a universal accelerometer comprising six acceleration sensors and amplifiers FIG. 3 An artist's conception of a portable digital motion analyzer and some digital motion analyzer can perform to.

Figure 1:
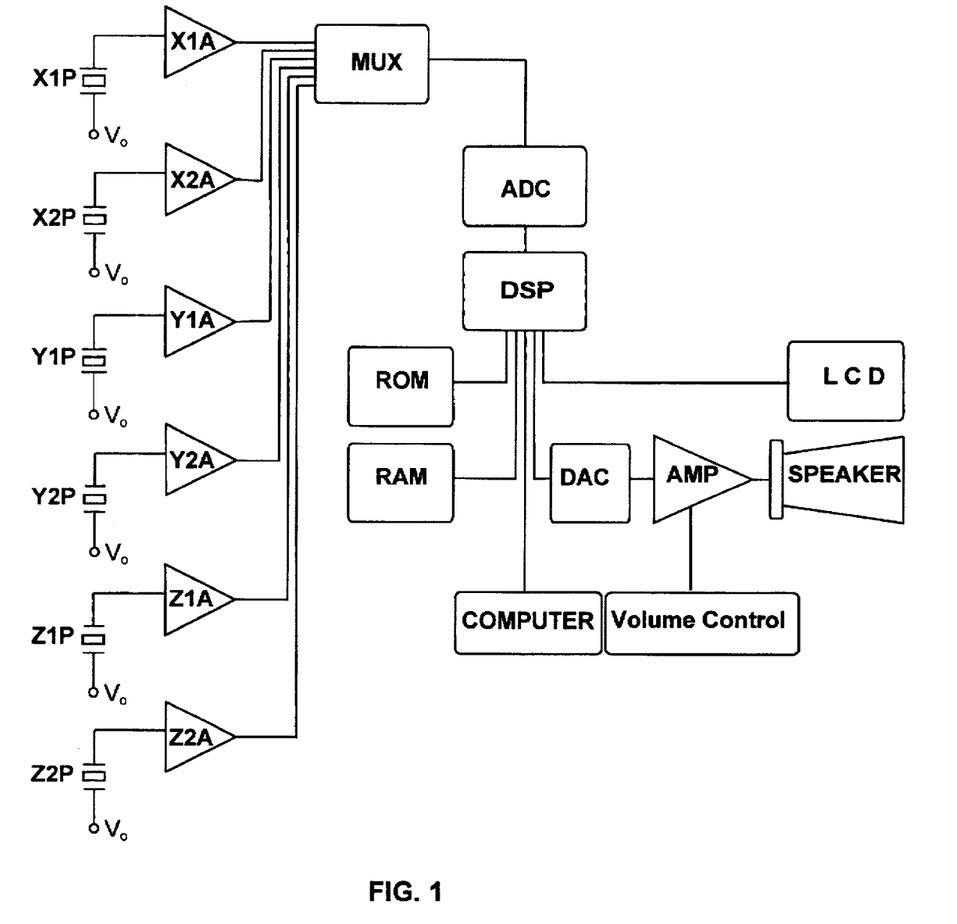
Figure 2:
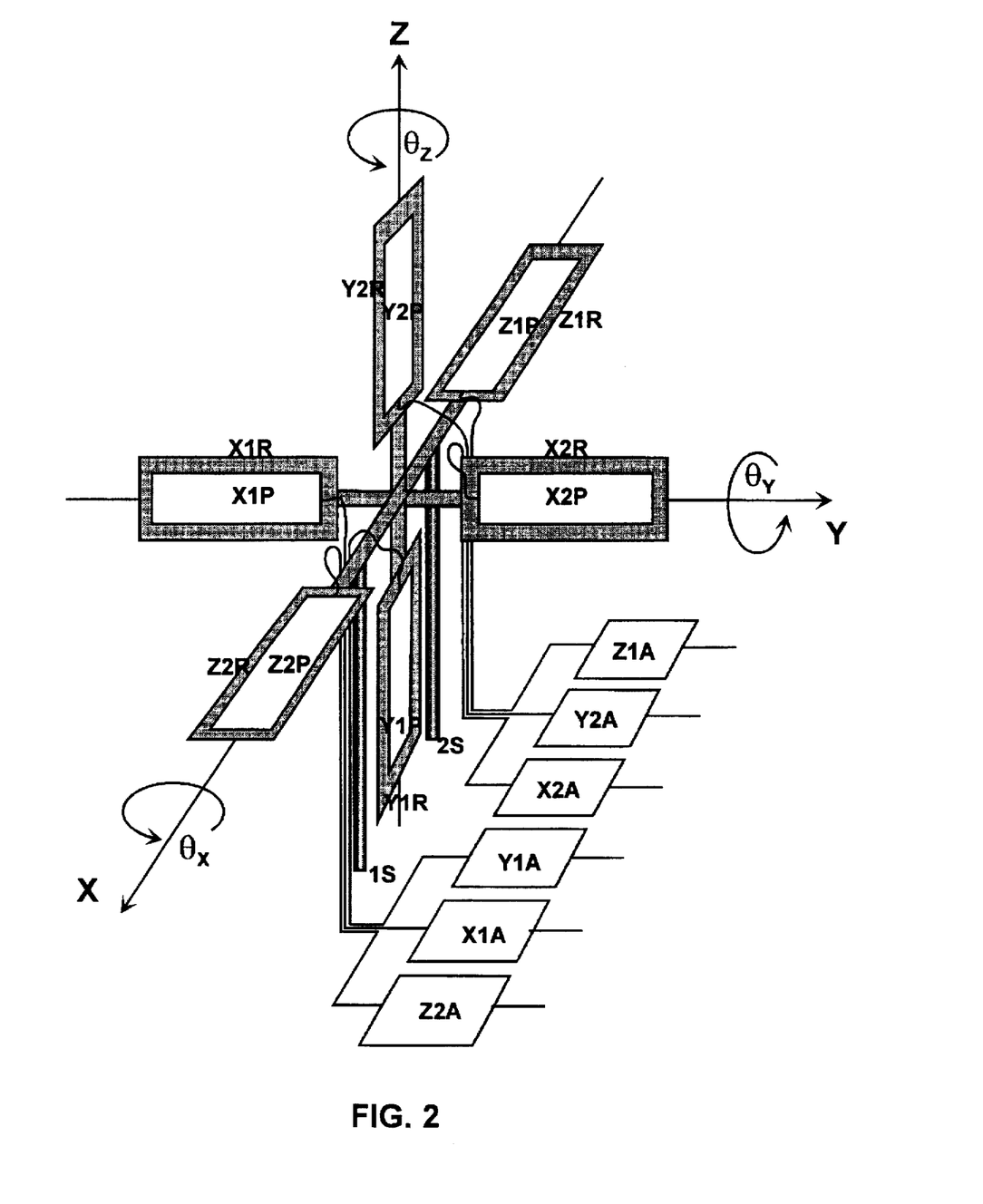

DESCRIPTION OF INVENTION (FIGS. 1, 2, and 3)

FIG. 1 illustrates the basic principle and the signal processing in a digital motion analyzer. Six acceleration sensor signals are amplified and are multiplexed by MUX, then digitized by ADC. Multiplexing is a common practice in the art to take advantage of the fast clock speed of the analog-to-digital converter, ADC. Multiplexing simplifies the hardware design by reducing the number of ADCs, from six to one in the present case.

The signal is processed digitally by a commercially available programmable Digital-Signal-Processor, DSP. Many low-cost DSPs are available now in thin low-profile plastic packages with low power consumption, which are ideal for various portable applications.[5] They are being used for audiovisual applications such as for the cellular phones and the video conferencing. A DSP program for signal processing and device controlling can be developed on a computer and down-loaded to a non-volatile read-only memory, ROM. After down-loading, the unit can be disconnected from the computer, powered by a battery, and becomes portable. Measured and calculated parameters of the motion are displayed on the LCD screen. The DSP is also programmed to synthesize musical sounds, whose frequency and amplitude are uniquely and distinctly related to the measured motion. For instance, several dynamic variables can be assigned to different frequency channels for a real time monitoring and feedback control of motions.

[5]"Telecommunication Applications With the TMS320C5x DSPs," Texas Instruments, (1994)

Pre-recorded motion of an accomplished performer can also be down-loaded to the ROM by the computer. The computer may either be disconnected in the portable applications, or remain connected for non portable applications, such as for the program development, for simulations, or for a detailed analysis of a motion. All the acceleration sensor signals can be simultaneously displayed and compared with another person's motions.

FIG. 2 shows an artist's conception of a universal accelerometer in the preferred embodiment. Each of the six identical sensors is oriented in the particular direction as shown in FIG. 2 such that they can measure the necessary and sufficient number of variables for uniquely and distinctly describing the motion of a rigid body. The sensor assembly must be attached rigidly onto the moving object. Each sensor comprises of a piezoelectric film that is attached to a metallic ribbon in such a way that they bend together when they accelerate in the direction normal to the surface. In FIG. 2, X1P is a piezoelectric film attached to the ribbon X1R which bends when the unit is accelerated in the X direction. The voltage generated on the piezoelectric film X1P is proportional to the stress imposed on X1R which, in turn, is proportional to the acceleration of X1R in the X direction. Likewise, the voltage induced on X2P is proportional to the acceleration of the beam X2R in the X direction. The two voltages induced on X1P and X2P are different if there is an angular acceleration of the object around the Z axis. Thus the sum of the two voltages induced on X1P and X2P is proportional to the average acceleration of the unit in the X direction. The difference of the two voltages induced on X1P and X2P is proportional to the angular acceleration around the Z axis. Likewise, the sum of the voltages induced on Y1P and Y2P is proportional to the average acceleration of the unit in the Y direction and the difference of the two voltages induced on Y1P and Y2P is proportional to the angular acceleration of the unit around the X axis. Likewise, the sum voltage of Z1P and Z2P is proportional to the average acceleration of the unit in the Z direction and the difference of the two voltages induced on Z1P and Z2P is proportional to the angular acceleration of the unit around the Y axis.

The universal accelerometer thus measures all the six coordinates that are necessary and sufficient to describe the motion of a rigid body uniquely and distinctly.[6] The buffer amplifiers marked as X1A, X2A, Y1A, Y2A, Z1A and Z2A in FIG. 2 have high input impedances and are placed very close to the voltage source in order to maintain good low frequency responses. Additional sensors are required to measure deformations of the object. We can measure such deformations also using a plurality of similar sensors. For example, bending of the shaft of a golf club can be measured by attaching a piezoelectric sensor directly, in stead of indirectly via a ribbon, to the shaft.

[6] See, for instance, Jerry B. Marion, "Classical Dynamics of Particles and Systems," Academic Press, (1965)

Figure 3A:
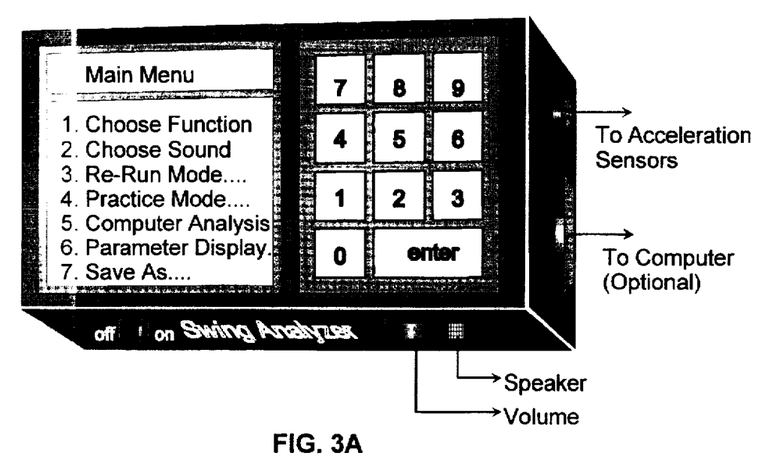
Figure 3B:
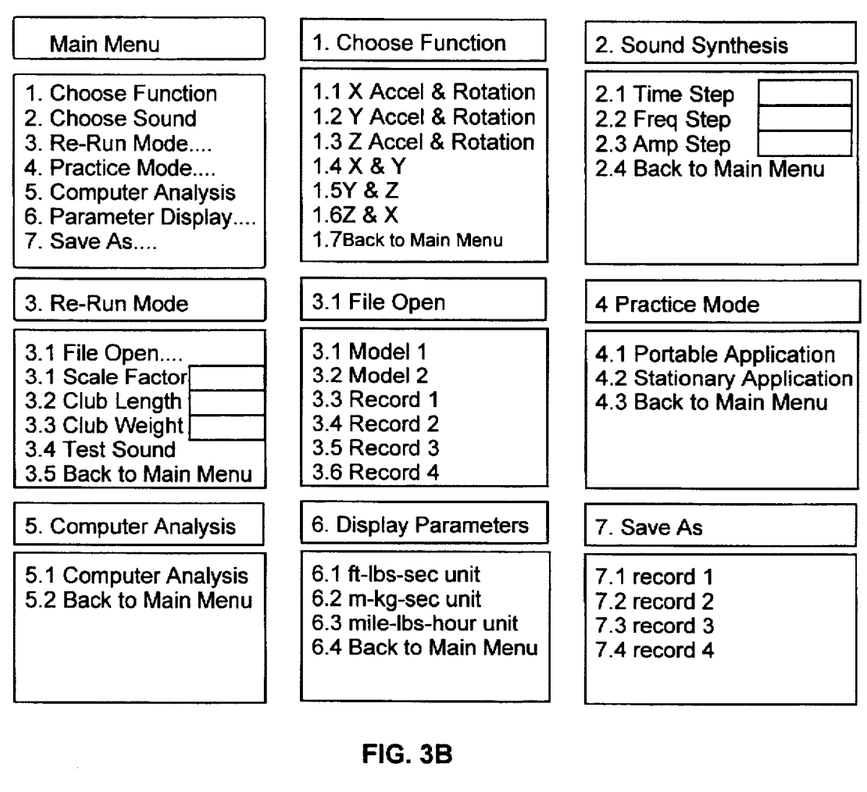

The universal accelerometer can be attached to the encapsulation via the support rods 1S and 2S. The size of the sensor is determined by the stiffness of the ribbon and the magnitude of the acceleration to be measured. The size of the accelerometer can be made small enough to be attached in a moving object, such as in the head of a golf club. FIG. 3A shows an artist's conception of a portable digital motion analyzer, which has an LCD screen and a numeric pad for user interface. The device is controlled by a user-friendly pulldown menu that can be selected from the screen by typing the corresponding number from the numeric pad. Some of the possible functions the device can perform are illustrated in the sample menus shown in FIG. 3B.

The DSP can be programmed to calculate the linear acceleration, the angular acceleration, the linear velocity, the angular velocity, the position, and the orientation of the moving object, using the sensor data. If a projectile is involved, the energy and the momentum conservation laws can be used to calculate the initial velocity vector and the spin vector of the projectile. From this data the trajectory of the projectile can also be calculated.[8]

[8] John M. Davis, "The aerodynamics of golf balls," Journal of Applied Physics 20, 821 (1949)

The portable digital motion analyzer and the acceleration sensors are connected via wires in the present embodiment as shown in FIG. 3A. In some applications wireless data transmission is desirable or an absolute necessity. In such cases, the connection can be made wireless by adding an rf transmitter in the sensor package and an rf receiver in the analyzer package. Wireless technology has already been developed and being used in various applications such as the garage-door openers, the wireless TV controls, and the wireless telephones.

DESCRIPTION—OPERATION OF INVENTION

Creating Sounds of Motion

Learning starts with an imitation. Imitation of motion is usually more difficult than imitation of a sound. Our body has the extraordinary capability of remembering musical melodies better than physical motions. For example, consider a virtuoso pianist practicing a very fast piano music. Imagine that the piano, for some terrible reasons, does not make any sound, so that the pianist has to practice by observing visually an accomplished player and try to imitate the finger motions. It is clearly very difficult, if not impossible, for him to create a good music in this way. We can apply the same principle in sports training. We can utilize our audio sensory system, which has been idling while the rest of our body is busy trying to learn the physical skill. Audio signals offer a fast and intuitive means of playing back recorded motions. I first identify an accomplished performer who has mastered all the known theories and techniques of the sports and has extended the knowledge further through creative and painful explorations. Using the present invention, I record the motion of the accomplished professional player to the full extent of its details, and use it as my model that I try to imitate as closely as possible I use a sound to playback his motion.

I may elect to listen to the sound a few times, or as many times as necessary to memorize the melody. Then I am ready to actually try my own motion while listening to my own motion and comparing it with that of the model. By memorizing the melody I acquire the feeling of how a good golf swing should go and gains a sense of timing of the various actions. I repeat my practice until the sound my motion makes is substantially the same as the sound of the model. This is very similar to a musical instrument lesson whereby the student's movement must make the expected sound. I receive an instant feedback, so that I can make the necessary corrections right away.

A sound has a lot of structures in it. It has the frequency spectrum, the harmony, the rhythm, color that is different for different instruments, expressions such as crescendos, staccatos, etc. Here is an example of how we can synthesize a sound corresponding to a motion. First we assign a different frequency channel to each of the linear and angular accelerations. The frequencies may belong to the simple conventional musical scale whereby the sound forms a nice harmony. The kind of harmony, whether it is a major or a minor, can carry the message whether the student is too fast, just right, or too slow. The rhythm can be made to follow the speed of the object such that a fast rhythm corresponds to a fast speed. The loudness of each frequency can be made to follow the magnitude of the corresponding acceleration. The sound will show the timing of different motions in different directions as a musical arpeggio.

Prior to the beginning of the practice, the student set his personal practice goal that is compatible with his physical skill and strength. He selects a scaling factor such that the model motion is slowed down and the corresponding acceleration reduced. Next, he decides which particular aspect of the motion he wants to work on. The way the sound is synthesized can be optimized for the student's practice goal. The multiple frequency sound described in the previous paragraph may be good enough. If the student wants to work on a particular aspect of the motion and choose a single parameter, then the sound may be synthesized in a different way. The frequency and the amplitude of the sound may be linearly related to the magnitude of that parameter, whereby the frequencies change according to the usual musical scale and the amplitude may also be related to the magnitude of that parameter. The rhythm may follow the speed of the object.

Another possible way is to create a sound that is related to the difference between the student's motion and the model's motion. This mode of operation is useful when the student has identified a particular problem that he wants to zero in, literally. The student receives a warning when the student's motion deviates from the model by more than a certain preset value so that the student knows when and how he has made the mistake. There is no sound generated when the student's motion is perfect in this mode. The biofeedback mechanism is in effect when the student corrects his motion by reducing the sound. There can be many more extensions of this idea of using audio signals for sports training.

Theory of Motion Analysis

The acceleration sensors can be calibrated by subjecting it to a known acceleration. The linear and the angular accelerations can be calculated from the calibration data. The linear velocity, the angular velocity, the position and the orientation of the object can be calculated by integrating the accelerations. Because the accelerations are measured in the moving coordinate system, the centrifugal forces and the gravitational acceleration must be taken into account properly. The Coriolis forces are very small, because it is proportional to the velocity of the sensors in the moving coordinate system that is negligible.

The theory presented in this section can be found in many text books on classical mechanics.[7] We assume that the processed signals, the three sum voltages, $V_{XS}$, $V_{YS}$, and $V_{ZS}$, and the three difference voltages, $V_{XN}$, $V_{YD}$, and $V_{ZD}$, are now calibrated and represent the accelerations in the appropriate units. Using the notations of the moving coordinate system of FIG. 2, the processed signals are related to the inertial accelerations as shown in the following vector equations:

$$V_D = d\omega/dt; \qquad (1)$$

$$V_S = d^2R/dt^2 + \omega \times v + g; \qquad (2)$$

where the bold characters denote vector variables, the sum vector $V_S = (V_{XS}, V_{YS}, V_{ZS})$, the difference vector $V_D = (V_{XD}, V_{YD}, V_{ZD})$, the angular velocity vector $\omega = (d\theta_X/dt, d\theta_Y/dt, d\theta_Z/dt)$, the position vector $R = (X, Y, Z)$, the linear velocity vector $v = (dX/dt, dY/dt, dZ/dt)$, and the gravitational acceleration g. The vector cross product $\omega \times v$ represent the centrifugal force. Equation (1) Equation (1) and (2) are more practical in the scalar format:

$$V_{XD} = d^2\theta_Y/dt^2, \qquad (3)$$

$$V_{YD} = d^2\theta_Z/dt^2, \qquad (4)$$

$$V_{ZD} = d^2\theta_X/dt^2, \qquad (5)$$

$$V_{XS} = d^2X/dt^2 + (d\theta_Y/dt)(dZ/dt) - (d\theta_Z/dt)(dY/dt) + g \cos(\Theta_g) \cos(\Phi_g) \qquad (6)$$

$$V_{YS} = d^2Y/dt^2 + (d\theta_Z/dt)(dX/dt) - (d\theta_X/dt)(dZ/dt) + g \cos(\Theta_g) \sin(\Phi_g) \qquad (7)$$

$$V_{ZS} = d^2Z/dt^2 + (d\theta_X/dt)(dY/dt) - (d\theta_Y/dt)(dX/dt) + g \sin(\Theta_g), \qquad (8)$$

where $g = |g| = 9.8$ m/sec², $\Theta_g$ is the angle that g makes with the Z axes, and $\Phi_g$ is the angle that the projection of g on the XY plane makes with the X axes.

See, for instance, Jerry B. Marion of footnote 5, Chapter 13

The velocities and the positions are calculated by integrating equations (3) through (8). First, the angular velocity $\omega = (d\theta_X/dt, d\theta_Y/dt, d\theta_Z/dt)$ is calculated by integrating equations (3), (4), and (5). The linear velocity, $v = (dX/dt, dY/dt, dZ/dt)$, is calculated by integrating equations (6), (7), (8) using $\omega$ and the values of dX/dt, dY/dt, and dZ/dt calculated in the previous time step. The orientation and the position, $\theta_Y$, $\theta_Z$, $\theta_X$, X, Y, and Z are then calculated by simply integrating $\omega$ and v. The orientation changes at each time step, and the values of the angles $\Theta_g$ and $\Phi_g$ are also updated.

It is useful to introduce an other coordinate system (UVW) which is stationary. The coordinate of the origin of the XYZ coordinate system with respect to the stationary system is assumed to be U, V, and W. The orientation of the XYZ coordinate system with respect to the UVW coordinate system is given by the Eulerian angles[5] $\Theta$, $\Phi$, $\Psi$. At each time step the orientation of the (XYZ) coordinate system changes by the amount calculated using the method described in the previous paragraph. Therefore, using the standard linear coordinate transformation methods, the variables U, V, W, $\Theta$, $\Phi$, and $\Psi$ can also be calculated as functions of time.

[5]"Telecommunication Applications With the TMS320C5x DSPs," Texas Instruments, (1994)

If a projectile such as a golf ball is involved, the linear and the angular momentum of the ball right after the impact can be calculated from the energy and the momentum conservation laws. The energy and the linear and the angular momentum are equal to the changes of the same quantities before and after the impact. Trajectory of the ball can be calculated using the linear and the angular momentum of the ball right after the impact in a straight forward way using the standard aerodynamic theories.[8]

[8]John M. Davis, "The aerodynamics of golf balls," Journal of Applied Physics 20, 821 (1949)

Figure 4:
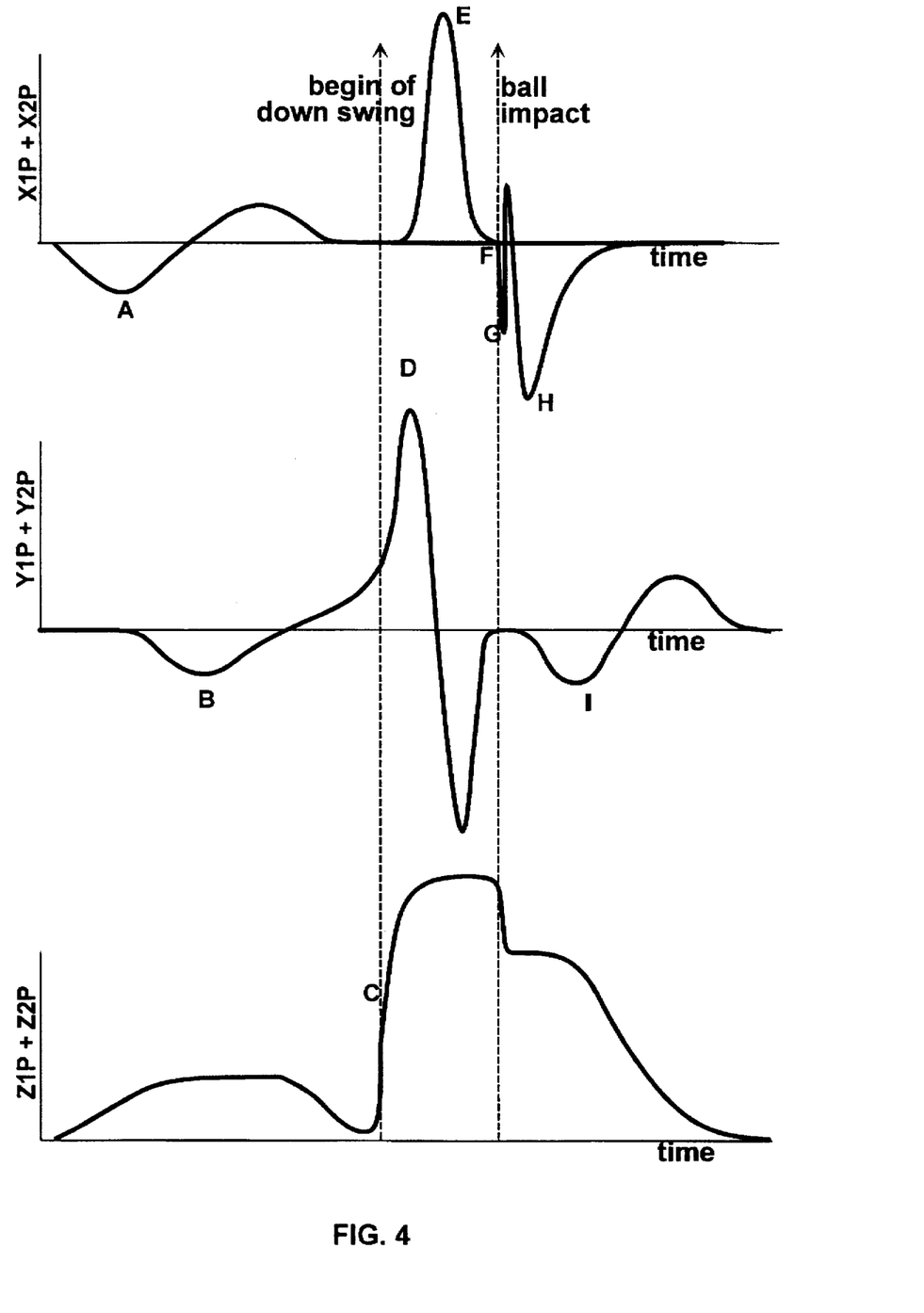
FIG. 4 Some features of the expected accelerations as functions of time in a golf swing FIG. 5 An example flow diagram of a DSP program.
Figure 5:
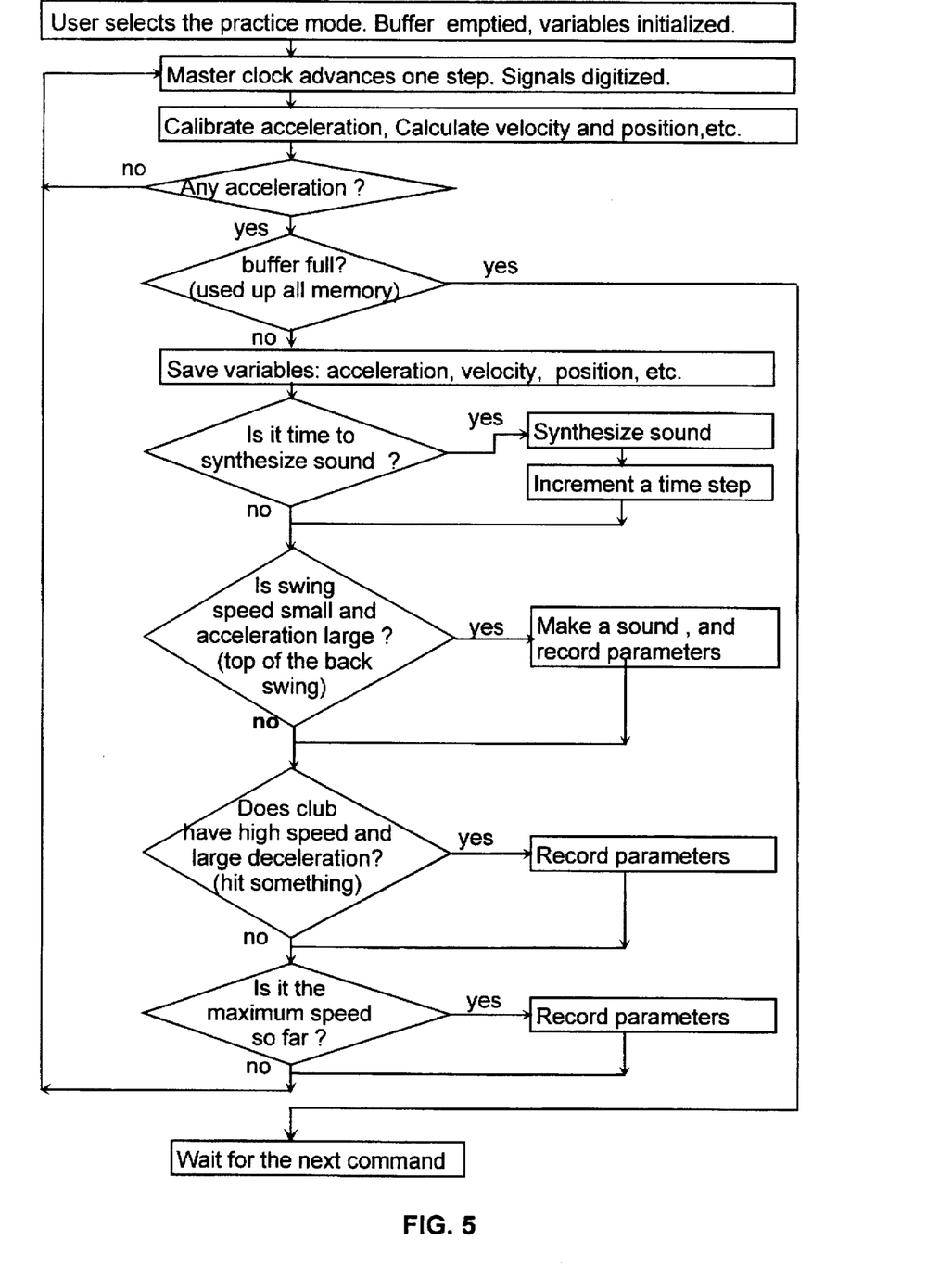

An example—a Golf Swing (FIGS. 4 and 5)

We now take a closer look at a golf swing. A golfer moves his club by twisting the upper torso, cocking the wrists, lifting the arms, and shifting weights in a particular time sequence. We will examine what kind of signals the sensors will see from these motions. In order to proceed further we need to define our coordinate system. Let us assume that the sensor assembly in FIG. 2 is attached firmly inside the club head such that the golf ball is in the +X direction, the shaft of the club is in the +Z direction, and the heel of the club is in the +Y direction.

Before the swing, he may try to relax his muscles by turning his upper torso and the arms. This action moves the club head back and forth in the X direction, and a rotation around the Y axis. He may then try to feel the weight of the club by cocking and uncocking his wrists. This action makes the club move in the Y direction, and rotate around the X axis.

The club head draws approximately a circle during the full swing. We define the swing plane as the plane where the imaginary circle lies. We now make the following approximation to see some of the important effects: (1) since the centrifugal force is mostly in the in the Z direction we drop the centrifugal terms in equations 3 and 4; (2) since the gravitational forces have about 8% effect according to Jorgensen[1] we drop all the gravitational terms also. (In actual programming, I keep all these terms.) The resulting equations are:

$$V_{XS} = d^2X/dt^2; \qquad (9)$$

$$V_{YS} = d^2Y/dt^2; \qquad (10)$$

$$V_{ZS} = d^2Z/dt^2 + (d\theta_X/dt)(dY/dt) - (d\theta_Y/dt)(dX/dt). \qquad (11)$$

$V_{XS}$ is proportional to the acceleration of the club in the X direction, $V_{YS}$ is proportional to the acceleration of the club in the Y direction, and $V_{ZS}$ is proportional to the acceleration of the club in the Z direction plus the centrifugal force due to the motion in the X and Y directions. Since the club starts with zero velocity and ends with zero velocity, the integral of $V_{XS}$ and $V_{YS}$ over the entire time interval should be null.

The acceleration waveforms for a typical golf swing may look as shown in FIG. 4. Even with all the simplifications we have made in the previous paragraph the waveforms still look quite complicated. The acceleration waveforms are shown here just for an illustration. They do not have to look as depicted in FIG. 4 for the present invention to be valid. The details of the actual acceleration waveforms for a particular golfer may look more complicated and will be as unique as his handwritings. The waveforms depicted here is consistent with the Jorgensen's two-dimensional theoretical analysis[1] of the stroboscopic picture. However, the three-dimensional picture shown here has more information than Jorgensen's two-dimensional picture. The sequence of events and the corresponding sensor signals at the times marked as A, B, C, D, E, F, G, H, and I in FIG. 4 are explained below:

A: From the address position, the golfer starts his back swing by turning his upper torso. The arms and the shoulder must form a triangle and move as one piece with the upper torso. The club head is accelerating in the −X direction, which gives $V_{xs}<0$, and no acceleration in the Y direction, $V_{ys}=0$. The Z sensor starts to sense the centrifugal force as the swing speed builds up slowly which gives $V_{zs}>0$.

B: He cannot turn his shoulders and upper torso more than about 90 degrees because of the resist coming from his hip and his legs. However, he continues his back swing by cocking his wrists and raising his arms. This action causes the club head to accelerate in the −Y direction. The swing momentum is transferred from the X direction to the Y direction which effects a deceleration in the X direction and an acceleration in the Y direction. The back swing speed and the corresponding centrifugal force measured by $V_{zs}$ keep increasing.

C: At the end of the back swing (or at the beginning of the down swing) the club is almost standing still. However, there is a robust acceleration in the +Z direction. This acceleration is caused by the student shifting his weight to the left, and lowering of the arms.

D: Turning of the shoulders and the upper torso at this phase of the down swing generates a strong acceleration in the +Y direction. The Z sensors start to sense the centrifugal force as the swing speed is picking up.

E: Uncocking of the wrists crossing over of the right arm over the left arm transforms the Y momentum to X momentum which transfers the Y signal to X signal. The Y sensors feel as if the club is decelerating but the X sensors feel that the club is accelerating. Z sensors do not care and only feel the increasing centrifugal force.

F: The club is now moving so fast that the body is just busy keeping up with the speed of the club and the centrifugal force.

G: At impact with the ball, the club slows down briefly, giving up some of its energy and momentum to the ball. The time duration of the interaction between the club and the ball is finite depending on the softness of the ball and the club. A firm grip at this point may give some additional push to the ball effectively by resisting the deceleration. Immediately after the impact, the club accelerates again but for a short time as it is freed from the burden of the reactive force of the ball.

H: In the follow-through swing the golfer turns his upper torso. He starts to slow down as his shoulders turn approximately 90 degrees.

I: He cannot turn his shoulders and upper torso more than about 90 degrees as his lower body starts to resist further rotation. However, he continues his follow-through swing by cocking his wrists and raising his arms. This action transfers the momentum from the X to the Y direction.

The X sensors sense decreasing speed while the Y sensors sense increasing speed in the −Y direction. Eventually the clubs come to a stop.

The down swing takes about 250 milliseconds for professional golfers[1] and longer for average golfers. Synthesis of sound can proceed as the following using the conventional musical scale. We assign a "Do" sound to the Z acceleration, a "Me" sound to the Y acceleration, and a "Sol" sound to the X acceleration. During the down swing, acceleration in Z increases first and stays flat, and we will hear the "Do" sound comes on first and stays on. Next we will hear a "Me" sound in addition to the "Do" sound briefly as the Y acceleration peaks. Next we will hear the "Sol" sound as the X acceleration peaks. The golfer can monitor the timing of his down swing using the timing of these sounds.

FIG. 5 illustrates a DSP program. This program measures and stores the motion and generates a continuous characteristic sound as the user practices a golf swing. It also calculates the velocities, positions, and orientations and stores the information. The program checks whether the club has reached the top of the back swing and notify the user by ringing a bell, by monitoring if the swing velocity is low and acceleration is high. It also senses ball impact by monitoring if a sharp deceleration during a high speed occurs and saves the swing speed and the swing direction at impact. It calculates the reductions of the kinetic energy, the linear momentum, and the angular momentum of the club before and after the ball impact. By the energy and the momentum conservation laws, the kinetic energy, and the linear and the angular momentum of the ball right after the impact can be calculated and the trajectory of the ball can be calculated. All information is stored for a further computer analysis.

SUMMARY, RAMIFICATION AND SCOPE

Accordingly, the reader will see that the present invention offers a new method of training physical skills using the digital motion analyzer and the universal accelerometer using audiovisual means and biofeedback means. Furthermore, the device is portable which is a very important feature for sports training. The method has further advantages in that:

(1) The student can obtain a real time feedback and take advantage of the biofeedback mechanisms to correct and improve his motion;

(2) A direct comparison of the student's motion and the model's motion is possible in real time using the digital signal processing technology;

(3) Three dimensional measurements make the timing diagnostics possible in real time;

(4) Playing back the recorded motions using audiovisual means makes it possible for the student to review his practice and compare with other motions in the database;

(5) The device is portable which is a very important feature in sports training;

(6) The student can analyze his motion in a great detail by further calculating the velocity, the position, orientation, and the torque, and finding the cause and cure of problems, if any;

(7) If a projectile is involved, the trajectory of the projectile and the velocity, spin, carry distance, accuracy, etc. can be calculated;

Although the description above contains much specificity, these should not be construed as limiting the scope of the invention but as merely providing illustrations of some of the presently preferred embodiments of this invention. For example, the present method of training physical skills can be applied to many sports such as baseball, tennis, martial arts, gymnastics, etc. The external shape of the Digital Motion Analyzer can have other shapes, such as circular, oval, trapezoidal, etc.; the acceleration sensor can be of a different kind, such as acceleration sensors of an inertial type, piezoelectric materials of an oval shape, etc.

Thus the scope of the invention should be determined by the appended claims and their legal equivalents, rather than by the examples given in the preceding paragraphs.

What is claimed is:

1. A method of teaching a physical skill to a student, comprising steps of:
 (a) creating a model for the student using a method comprising steps of:
  (i) identifying and choosing a person to be used as a model;
  (ii) letting said model person perform said physical skill and measuring accelerations of objects wherein said objects are chosen from a group of objects comprising parts of the body of the model and objects carried by the model;

(iii) storing the measured data in a storage area;

(iv) modifying said data to fit the student's physical skills and limitations, by changing the speed and the corresponding acceleration by a predetermined scaling factor;

(b) playing back said model, using methods comprising audiovisual means;

(c) letting said student perform said physical skill and measuring accelerations of objects wherein said objects are chosen from a group of objects comprising parts of the body of the student and objects carried by the student;

(d) comparing the student's motion with the model, using methods comprising audiovisual means;

(e) letting said student repeatedly execute said physical skill while monitoring his motion using audiovisual means in real time until the student's motion substantially coincide with said model.

2. The method of claim 1 wherein said method further comprises steps of using said measured data and calculating and storing a group of variables comprising the linear accelerations, the angular accelerations, the linear velocity, the angular velocity, the position, the orientation of the objects, and, if a projectile is produced as a result of the motion, the trajectory of a projectile.

3. The method of claim 2 wherein said method further comprises steps of synthesizing a sound in real time wherein said sound is uniquely and distinctly related to the motion performed by the student or performed by the model.

4. The method of claim 3 wherein said sound is synthesized in such a manner that:

(i) said sound comprises a plurality of frequencies;

(ii) said student can assign a particular frequency to represent a particular variable chosen from a group of variables comprising the linear acceleration, the angular accelerations, the linear velocities, the angular velocities, the positions, and the orientations;

(iii) the amplitude of said sound at a particular frequency is related to the magnitude of the variable assigned to said frequency.

5. The method of claim 3, wherein the frequency and the amplitude of said sound is uniquely and distinctly related to the magnitude of a particular variable chosen from a group of variables comprising the linear acceleration, the angular accelerations, the linear velocities, the angular velocities, the positions, and the orientations.

6. The method of claim 3, wherein the frequency and the amplitude of said sound are uniquely and distinctly related to the difference between the magnitude of a particular variable of said student and the magnitude of the corresponding variable of said model, wherein said variable is chosen from a group of variables comprising the linear acceleration, the angular accelerations, the linear velocities, the angular velocities, the positions, and the orientations.

7. The method of claim 1, wherein said student's motion is stored and compared with a database of motions wherein said database comprises recorded and analyzed motions pertaining to the same physical skill performed by other persons whereby the student's motion can be identified with a plurality of motions in the database and readily analyzed.

8. The method of claim 2 wherein said variables and the trajectory of a projectile, if applicable, for both said student and said model are graphically displayed visually, whereby said student can inspect and analyze his motion visually, and compare with said model.

9. A digital motion analyzing apparatus comprising a sensor unit, a signal-processor unit, and a sound-synthesizing unit wherein:

(a) said sensor unit comprising a plurality of acceleration sensors, signal amplifying means, signal transmission means for sending acceleration sensor signals to said signal-processor unit, and mounting means for mounting said sensor unit to a moving object;

(b) said signal-processor unit comprising receiving means for receiving said acceleration sensor signals, an analog-to-digital converter for converting said signals to digital signals, a digital signal processor, a Read-Only-Memory (ROM), and a Random-Access-Memory (RAM);

(c) said sound-synthesizing unit comprising digital-to-analog converters for, audio amplifiers, and speakers for synthesizing a stereophonic sound;

wherein said synthesized sound uniquely and distinctly represents the motion of said moving object.

10. Apparatus of claim 9 wherein said apparatus has means of saving and storing said sensor signals in a storage area, and means of retrieving said stored sensor signals from the storage area wherein said signals can be used to synthesize a stereophonic sound wherein said synthesized sound uniquely and distinctly represents the motion of a moving object represented by said signal.

* * * * *